US012525203B2

(12) United States Patent
Hashimoto

(10) Patent No.: US 12,525,203 B2
(45) Date of Patent: Jan. 13, 2026

(54) ELECTRONIC DEVICE

(71) Applicant: Innolux Corporation, Miaoli County (TW)

(72) Inventor: Kazuyuki Hashimoto, Miaoli County (TW)

(73) Assignee: Innolux Corporation, Miaoli County (TW)

( * ) Notice: Subject to any disclaimer, the term of this patent is extended or adjusted under 35 U.S.C. 154(b) by 0 days.

(21) Appl. No.: 18/732,646

(22) Filed: Jun. 4, 2024

(65) Prior Publication Data

US 2025/0095599 A1 Mar. 20, 2025

Related U.S. Application Data

(60) Provisional application No. 63/539,324, filed on Sep. 19, 2023.

(51) Int. Cl.
*G09G 3/36* (2006.01)

(52) U.S. Cl.
CPC ......... *G09G 3/3677* (2013.01); *G09G 3/3655* (2013.01); *G09G 2300/0408* (2013.01); *G09G 2310/08* (2013.01)

(58) Field of Classification Search
CPC ............... G09G 3/3677; G09G 3/3655; G09G 2300/0408; G09G 2310/08
See application file for complete search history.

(56) References Cited

U.S. PATENT DOCUMENTS

2005/0088390 A1* 4/2005 Tsuchi ................ G09G 3/2011
345/89

FOREIGN PATENT DOCUMENTS

CN 107146586 9/2017

* cited by examiner

*Primary Examiner* — Robert J Michaud
(74) *Attorney, Agent, or Firm* — JCIPRNET

(57) ABSTRACT

An electronic device is provided. The electronic device includes a slew rate control circuit. The slew rate control circuit includes a first transistor, a second transistor, an input terminal, and an output terminal. The slew rate control circuit is configured to receive a scan signal switching between a first high voltage level and a first low voltage level, and output an adjusted scan signal switching between a second high voltage level and a second low voltage level. The first transistor and the second transistor are the same type of transistors, and each forms a diode or a source follower amplifier.

18 Claims, 15 Drawing Sheets

ELECTRONIC DEVICE

CROSS-REFERENCE TO RELATED APPLICATION

This application claims the priority benefit of U.S. provisional application Ser. No. 63/539,324, filed on Sep. 19, 2023. The entirety of the above-mentioned patent application is hereby incorporated by reference herein and made a part of this specification.

BACKGROUND

Technical Field

The disclosure relates a device; particularly, the disclosure relates to an electronic device.

Description of Related Art

An active-matrix device (e.g. varactor antenna) consists of a plurality of tunable components (e.g. varactor) and a plurality of pixel circuits each with a scan transistor and a storage capacitor. In general, the use of large storage capacitors and large transistors in pixel circuits is crucial to mitigate the control voltage drop caused by varactor leakage and achieve fast scanning operations. However, the rapid rise and fall of the scan signal facilitates fast scan operation but causes drain avalanche hot-carrier (DAHC) stress and large kickback effect of the scan transistor. In addition, the small input impedance (i.e. the gate end capacitance is large) of the large scan transistor will cause distortion of the scan signal, slowing down the rise and fall speed of the far end of the scan driver, and worsening the uniformity (i.e. the signal difference between the near side and the far side).

SUMMARY

The electronic device of the disclosure includes a slew rate control circuit. The slew rate control circuit includes a first transistor, a second transistor, an input terminal, and an output terminal. The slew rate control circuit is configured to receive a scan signal switching between a first high voltage level and a first low voltage level, and output an adjusted scan signal switching between a second high voltage level and a second low voltage level. The first transistor and the second transistor are the same type of transistors, and each forms a diode or a source follower amplifier.

The electronic device of the disclosure includes a slew rate control circuit. The slew rate control circuit includes a first transistor, a second transistor, an input terminal, and an output terminal. The slew rate control circuit is configured to receive a scan signal switching between a first high voltage level and a first low voltage level, and output an adjusted scan signal switching between a second high voltage level and a second low voltage level. The first transistor is an n-type transistor, and the second transistor is a p-type transistor. The first transistor and the second transistor each forms a diode or a source follower amplifier.

Based on the above, according to the electronic device of the disclosure, the electronic device may adjust the scan signal by the slew rate control circuit to effectively drive the tunable component through the pixel circuit.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
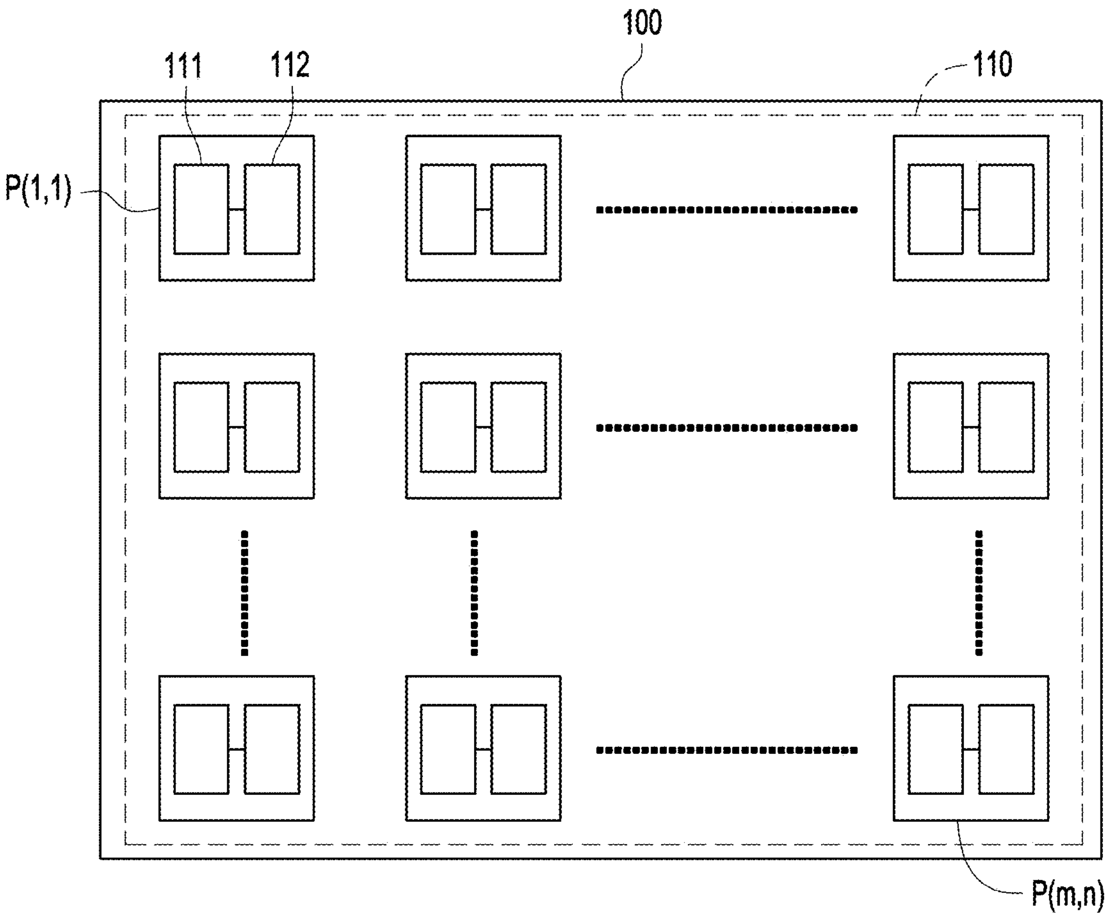
FIG. 1 is a schematic diagram of an electronic device according to an embodiment of the disclosure.

Reference will now be made in detail to the exemplary embodiments of the disclosure, examples of which are illustrated in the accompanying drawings. Whenever possible, the same reference numbers are used in the drawings and the description to refer to the same or like components.

Certain terms are used throughout the specification and appended claims of the disclosure to refer to specific components. Those skilled in the art should understand that electronic device manufacturers may refer to the same components by different names. This article does not intend to distinguish those components with the same function but different names. In the following description and rights request, the words such as "comprise" and "include" are open-ended terms, and should be explained as "including but not limited to . . . ".

The term "coupling (or connection)" used throughout the whole specification of the present application (including the appended claims) may refer to any direct or indirect connection means. For example, if the text describes that a first device is coupled (or connected) to a second device, it should be interpreted that the first device may be directly connected to the second device, or the first device may be indirectly connected through other devices or certain connection means to be connected to the second device. The terms "first", "second", and similar terms mentioned throughout the whole specification of the present application (including the appended claims) are merely used to name discrete elements or to differentiate among different embodiments or ranges. Therefore, the terms should not be regarded as limiting an upper limit or a lower limit of the quantity of the elements and should not be used to limit the arrangement sequence of elements. In addition, wherever possible, elements/components/steps using the same reference numerals in the drawings and the embodiments represent the same or similar parts. Reference may be mutually made to related descriptions of elements/components/steps using the same reference numerals or using the same terms in different embodiments.

FIG. 1 is a schematic diagram of an electronic device according to an embodiment of the disclosure. Referring to FIG. 1, an electronic device 100 includes an active matrix device 110, and the active matrix device 110 includes a plurality of pixels P(1,1) to P(m,n), where m and n are positive integers. The pixels P(1,1) to P(m,n) may be arranged in an array as shown in FIG. 1. In the embodiment of the disclosure, each of the pixels P(1,1) to P(m,n) includes a pixel circuit 111 and a tunable component 112, and the pixel circuit 111 is coupled to a tunable component 112. In the embodiment of the disclosure, the tunable component 112 may be a voltage-controlled component (e.g. a variable capacitor, a varactor diode, or a Micro Electro Mechanical System (MEMS)), but the disclosure is not limited thereto. In the embodiment of the disclosure, the electronic device 100 may be a display device or an antenna device, but the disclosure is not limited thereto.

Figure 2:
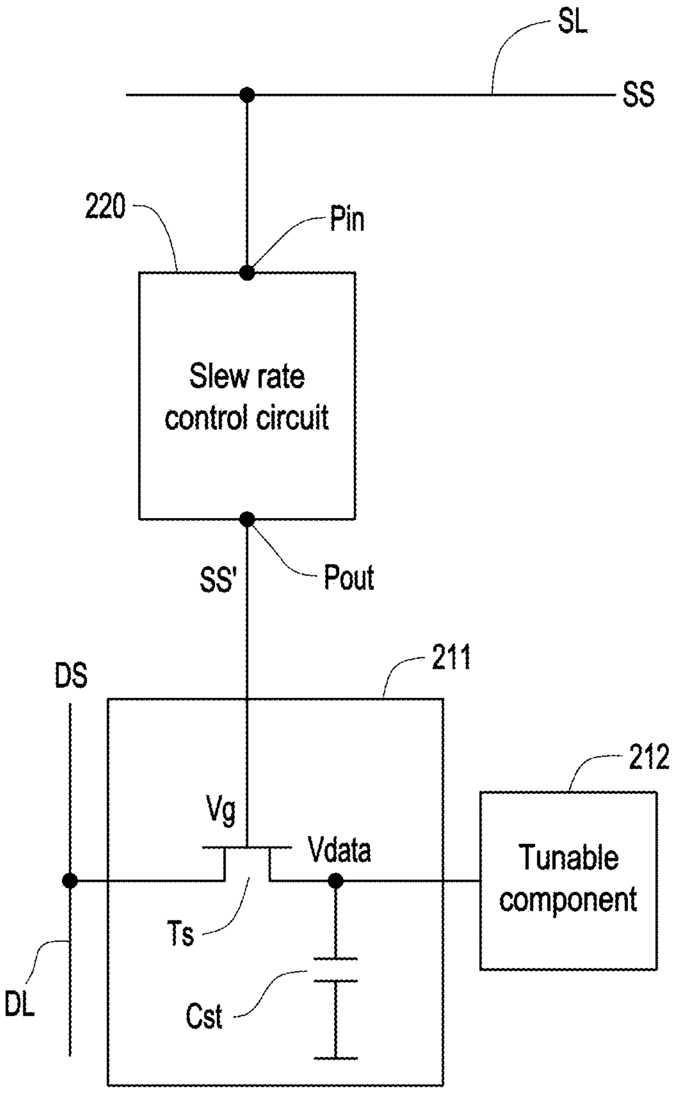
FIG. 2 is a schematic diagram of a slew rate control circuit and a pixel according to an embodiment of the disclosure.

FIG. 2 is a schematic diagram of a slew rate control circuit and a pixel according to an embodiment of the disclosure. Referring to FIG. 2, the electronic device 100 further includes a slew rate control circuit 220. The slew rate control circuit 220 includes an input terminal Pin and an output terminal Pout. The input terminal Pin of the slew rate control circuit 220 is coupled to a scan signal line SL to receive a scan signal SS switching between a first high voltage level and a first low voltage level, and the output terminal Pout of the slew rate control circuit 220 is coupled to a pixel including a pixel circuit 211 and a tunable component 212 to output an adjusted scan signal SS' switching between a second high voltage level and a second low voltage level. The output terminal Pout of the slew rate control circuit 220 is coupled to the pixel circuit 211, and the pixel circuit 211 is further coupled to the tunable component 212.

In the embodiment of the disclosure, the pixel circuit 211 includes a scan transistor Ts and a storage capacitor Cst. A control terminal of the scan transistor Ts is coupled to the output terminal Pout of the slew rate control circuit 220. A first terminal of the scan transistor Ts is coupled to a data signal line DL to receive a data signal DS. A second terminal of the scan transistor Ts is coupled to the tunable component 212 and the storage capacitor Cst. In the embodiment of the disclosure, a gate voltage Vg of the control terminal of the scan transistor Ts is determined by the adjusted scan signal SS'. In the embodiment of the disclosure, the scan transistor Ts may be an n-type transistor, but the disclosure is not limited thereto. When the adjusted scan signal SS' provides a low voltage level, the scan transistor Ts is turned-off. When the adjusted scan signal SS' provides a high voltage level, the scan transistor Ts is turned-on. The scan transistor Ts provides the data signal DS to the storage capacitor Cst, so as to provide a data voltage Vdata to the tunable component 212 according to the data signal DS.

Figure 3:
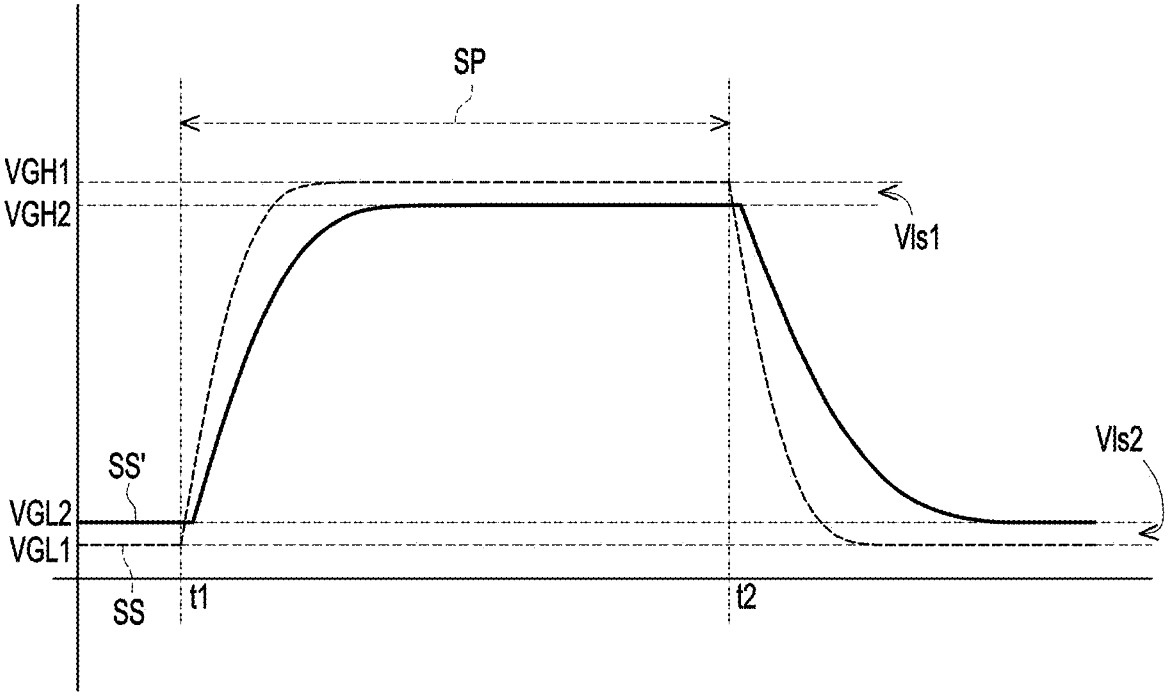
FIG. 3 is a schematic waveform diagram of a scan signal and an adjusted scan signal according to an embodiment of the disclosure.

FIG. 3 is a schematic waveform diagram of a scan signal and an adjusted scan signal according to an embodiment of the disclosure. Referring to FIG. 2 and FIG. 3, a scanning waveform of the scan signal SS may be as show in FIG. 3. During a scan period SP, the scan signal SS may change from a first low voltage level VGL1 to a first high voltage level VGH1. Specifically, after time t1, the voltage level of the scan signal SS may rise from the first low voltage level VGL1 to the first high voltage level VGH1. After time t2, the voltage level of the scan signal SS may fall from the first high voltage level VGH1 to the first low voltage level VGL1.

In the embodiment of the disclosure, the slew rate control circuit 220 may adjust at least one of a rising slew rate and a falling slew rate of the scan signal SS, and output the adjusted scan signal SS' as shown in FIG. 3. That is, at least one of a rising time and a falling time of the adjusted scan signal SS' is longer than a rising time and a falling time of the scan signal SS respectively. During the scan period SP, the adjusted scan signal SS' may change from a second low voltage level VGL2 to a second high voltage level VGH2. Specifically, after time t1, the voltage level of the adjusted scan signal SS' may rise from the second low voltage level VGL2 to the second high voltage level VGH2. After time t2, the voltage level of the adjusted scan signal SS' may fall from the second high voltage level VGH2 to the second low voltage level VGL2. In the embodiment of the disclosure, the rising time and the falling time of the adjusted scan signal SS' may be longer than the rising time and the falling time of the scan signal SS respectively. Therefore, a drain avalanche hot-carrier (DAHC) stress of the scan transistor Ts may be effectively reduced. In the embodiment of the disclosure, the falling slew rate of the adjusted scan signal SS' may be lower than the rising slew rate of the adjusted scan signal SS'. Therefore, a fast charging may be achieved and a kickback effect of the scan transistor Ts may be effectively reduced.

Figure 4A:
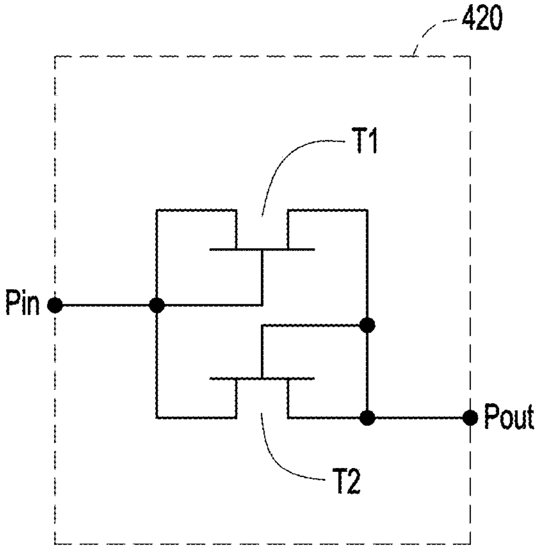
FIG. 4A is a schematic diagram of a slew rate control circuit according to an embodiment of the disclosure.
Figure 4B:
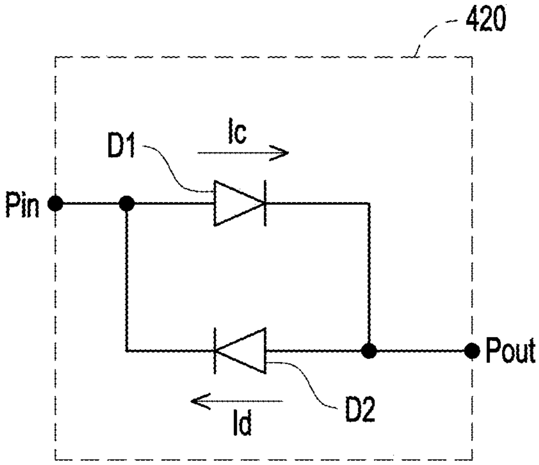
FIG. 4B is a schematic equivalent circuit diagram of the embodiment of FIG. 4A of the disclosure.

FIG. 4A is a schematic diagram of a slew rate control circuit according to an embodiment of the disclosure. FIG. 4B is a schematic equivalent circuit diagram of the embodiment of FIG. 4A of the disclosure. In the embodiment of the disclosure, the slew rate control circuit 220 of FIG. 2 may be implemented as the slew rate control circuit 420 of FIG. 4A. Referring to FIG. 4A, the slew rate control circuit 420 includes a first transistor T1, a second transistor T2, an input terminal Pin, and an output terminal Pout. A control terminal of the first transistor T1 is coupled to the input terminal Pin. A first terminal of the first transistor T1 is coupled to the input terminal Pin. A second terminal of the first transistor T1 is coupled to the output terminal Pout. A control terminal of the second transistor T2 is coupled to the output terminal Pout. A first terminal of the second transistor T2 is coupled to the input terminal Pin. A second terminal of the second transistor T2 is coupled to the output terminal Pout.

Referring to FIG. 4A and FIG. 4B, the first transistor T1 may be equivalent to a diode D1, and the second transistor T2 may be equivalent to a diode D2. An anode of the diode D1 is coupled to the input terminal Pin and a cathode of the diode D2. A cathode of the diode D1 is coupled to the output terminal Pout and an anode of the diode D2. The first transistor T1 and the second transistor T2 may be n-type transistors (i.e. same type of transistors). Referring to FIG. 3 and FIG. 4B, during a rising period of the voltage level of the scan signal SS, a charge current Ic flows from the anode of the diode D1 to the cathode of the diode D1. During a falling period of the voltage level of the scan signal SS, a discharge current Id flows from the anode of the diode D2 to the cathode of the diode D2. Thus, the output terminal Pout of the slew rate control circuit 420 may output the adjusted scan signal SS' as shown in FIG. 3, and the adjusted scan signal SS' may achieve a fast charging with a low DAHC stress and a low kickback effect of the scan transistor.

In addition, referring to FIG. 3 and FIG. 4A, a voltage loss Vls1 between the first high voltage level VGH1 of the scan signal SS and the second high voltage level VGH2 of the adjusted scan signal SS' is caused by a threshold voltage of the first transistor T1, and a voltage loss Vls2 between the first low voltage level VGL1 of the scan signal SS and the second low voltage level VGL2 of the adjusted scan signal SS' is caused by a threshold voltage of the second transistor T2. In the embodiment of the disclosure, the rising slew rate of the adjusted scan signal SS' is determined by an aspect ratio (i.e. length to width ratio (W/L)) of the first transistor T1, and the falling slew rate of the adjusted scan signal SS' is determined by an aspect ratio (i.e. length to width ratio (W/L)) of the second transistor T2.

Figure 5A:
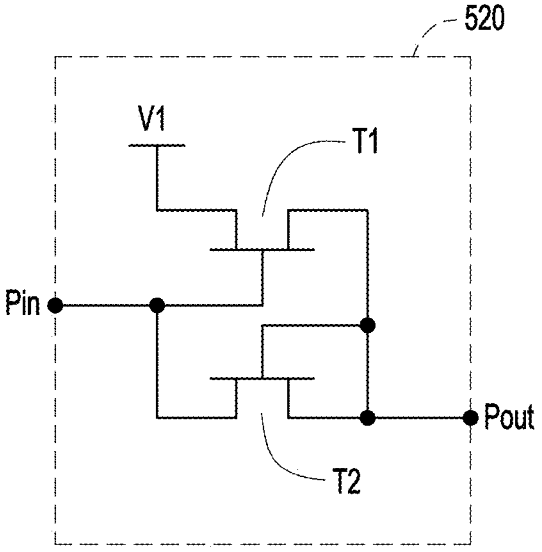
FIG. 5A is a schematic diagram of a slew rate control circuit according to an embodiment of the disclosure.
Figure 5B:
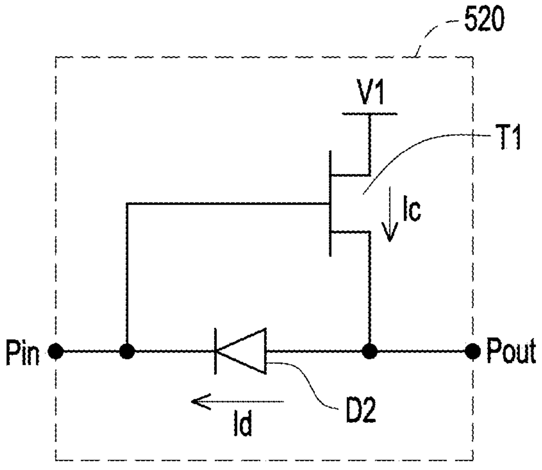
FIG. 5B is a schematic equivalent circuit diagram of the embodiment of FIG. 5A of the disclosure.

FIG. 5A is a schematic diagram of a slew rate control circuit according to an embodiment of the disclosure. FIG. 5B is a schematic equivalent circuit diagram of the embodiment of FIG. 5A of the disclosure. In the embodiment of the disclosure, the slew rate control circuit 220 of FIG. 2 may be implemented as the slew rate control circuit 520 of FIG. 5A. Referring to FIG. 5A, the slew rate control circuit 520 includes a first transistor T1, a second transistor T2, an input terminal Pin, and an output terminal Pout. A control terminal of the first transistor T1 is coupled to the input terminal Pin. A first terminal of the first transistor T1 is coupled to a direct current voltage V1. A second terminal of the first transistor T1 is coupled to the output terminal Pout. A control terminal of the second transistor T2 is coupled to the output terminal Pout. A first terminal of the second transistor T2 is coupled to the input terminal Pin. A second terminal of the second transistor T2 is coupled to the output terminal Pout. The first transistor T1 and the second transistor T2 may be n-type transistors.

Referring to FIG. 5A and FIG. 5B, the first transistor T1 may be equivalent to a source follower amplifier, and the second transistor T2 may be equivalent to a diode D2. A cathode of the diode D2 is coupled to the input terminal Pin and the control terminal of the first transistor T1. An anode of the diode D2 is coupled to the output terminal Pout and the second terminal of the second transistor T2. Referring to FIG. 3 and FIG. 5B, during a rising period of the voltage level of the scan signal SS, a charge current Ic flows from the first terminal of the first transistor T1 to the second terminal of the first transistor T1. During a falling period of the voltage level of the scan signal SS, a discharge current Id flows from the anode of the diode D2 to the cathode of the diode D2. Thus, the output terminal Pout of the slew rate control circuit 520 may output the adjusted scan signal SS' as shown in FIG. 3, and the adjusted scan signal SS' may achieve a fast charging with a low DAHC stress and a low kickback effect of the scan transistor.

In addition, referring to FIG. 3 and FIG. 5A, in the embodiment of the disclosure, a voltage level of the direct current voltage V1 may be higher than the first low voltage level VGL1, but the disclosure is not limited thereto. In one embodiment of the disclosure, the direct current voltage V1 may be equal to the first high voltage level VGH1.

Figure 6A:
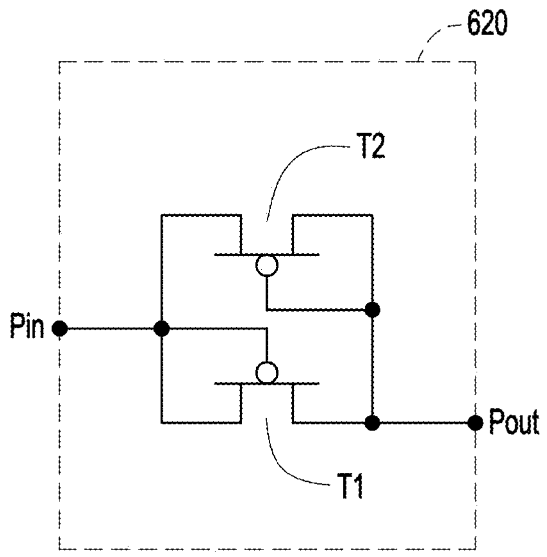
FIG. 6A is a schematic diagram of a slew rate control circuit according to an embodiment of the disclosure.
Figure 6B:
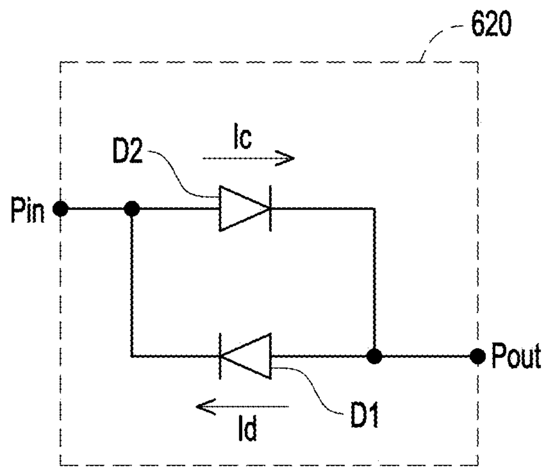
FIG. 6B is a schematic equivalent circuit diagram of the embodiment of FIG. 6A of the disclosure.

FIG. 6A is a schematic diagram of a slew rate control circuit according to an embodiment of the disclosure. FIG. 6B is a schematic equivalent circuit diagram of the embodiment of FIG. 6A of the disclosure. In the embodiment of the disclosure, the slew rate control circuit 220 of FIG. 2 may be implemented as the slew rate control circuit 620 of FIG. 6A. Referring to FIG. 6A, the slew rate control circuit 620 includes a first transistor T1, a second transistor T2, an input terminal Pin, and an output terminal Pout. A control terminal of the first transistor T1 is coupled to the input terminal Pin. A first terminal of the first transistor T1 is coupled to the input terminal Pin. A second terminal of the first transistor T1 is coupled to the output terminal Pout. A control terminal of the second transistor T2 is coupled to the output terminal Pout. A first terminal of the second transistor T2 is coupled to the input terminal Pin. A second terminal of the second transistor T2 is coupled to the output terminal Pout. The first transistor T1 and the second transistor T2 may be p-type transistors.

Referring to FIG. 6A and FIG. 6B, the first transistor T1 may be equivalent to a diode D1, and the second transistor T2 may be equivalent to a diode D2. A cathode of the diode D1 is coupled to the input terminal Pin and an anode of the diode D2. An anode of the diode D1 is coupled to the output terminal Pout and a cathode of the diode D2. The anode of the diode D2 is coupled to the input terminal Pin. The cathode of the diode D2 is coupled to the output terminal Pout. Referring to FIG. 3 and FIG. 6B, during a rising period of the voltage level of the scan signal SS, a charge current Ic flows from the anode of the diode D2 to the cathode of the diode D2. During a falling period of the voltage level of the scan signal SS, a discharge current Id flows from the anode of the diode D1 to the cathode of the diode D1. Thus, the output terminal Pout of the slew rate control circuit 620 may output the adjusted scan signal SS' as shown in FIG. 3, and the adjusted scan signal SS' may achieve a fast charging with a low DAHC stress and a low kickback effect of the scan transistor.

Figure 7A:
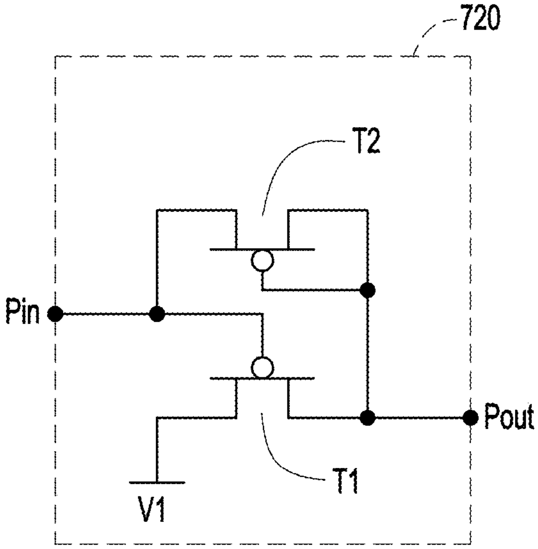
FIG. 7A is a schematic diagram of a slew rate control circuit according to an embodiment of the disclosure.
Figure 7B:
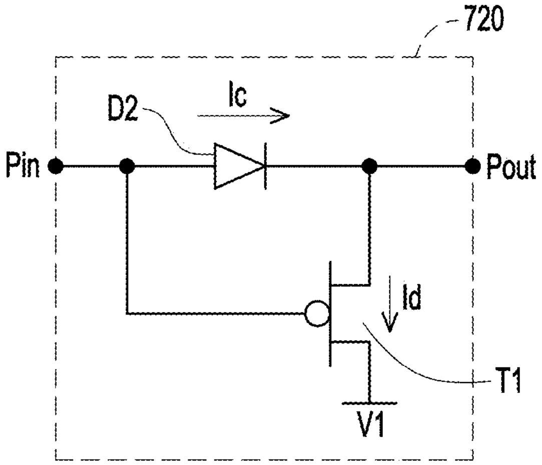
FIG. 7B is a schematic equivalent circuit diagram of the embodiment of FIG. 7A of the disclosure.

FIG. 7A is a schematic diagram of a slew rate control circuit according to an embodiment of the disclosure. FIG. 7B is a schematic equivalent circuit diagram of the embodiment of FIG. 7A of the disclosure. In the embodiment of the disclosure, the slew rate control circuit 220 of FIG. 2 may be implemented as the slew rate control circuit 720 of FIG. 7A. Referring to FIG. 7A, the slew rate control circuit 720 includes a first transistor T1, a second transistor T2, an input terminal Pin, and an output terminal Pout. A control terminal of the first transistor T1 is coupled to the input terminal Pin. A first terminal of the first transistor T1 is coupled to a direct current voltage V1. A second terminal of the first transistor T1 is coupled to the output terminal Pout. A control terminal of the second transistor T2 is coupled to the output terminal Pout. A first terminal of the second transistor T2 is coupled to the input terminal Pin. A second terminal of the second transistor T2 is coupled to the output terminal Pout. The first transistor T1 and the second transistor T2 may be p-type transistors.

Referring to FIG. 7A and FIG. 7B, the first transistor T1 may be equivalent to a source follower amplifier, and the second transistor T2 may be equivalent to a diode D2. An anode of the diode D2 is coupled to the input terminal Pin and the control terminal of the first transistor T1. A cathode of the diode D2 is coupled to the output terminal Pout and the second terminal of the first transistor T1. Referring to FIG. 3 and FIG. 7B, during a rising period of the voltage level of the scan signal SS, a charge current Ic flows from the anode of the diode D2 to the cathode of the diode D2. During a falling period of the voltage level of the scan signal SS, a discharge current Id flows from the second terminal of the first transistor T1 to the first terminal of the first transistor T1. Thus, the output terminal Pout of the slew rate control circuit 720 may output the adjusted scan signal SS' as shown in FIG. 3, and the adjusted scan signal SS' may achieve a fast charging with a low DAHC stress and a low kickback effect of the scan transistor.

In addition, referring to FIG. 3 and FIG. 7A, in the embodiment of the disclosure, a voltage level of the direct current voltage V1 may be lower than the first high voltage level VGH1, but the disclosure is not limited thereto. In one embodiment of the disclosure, the direct current voltage V1 may be equal to the first low voltage level VGL1.

Figure 8A:
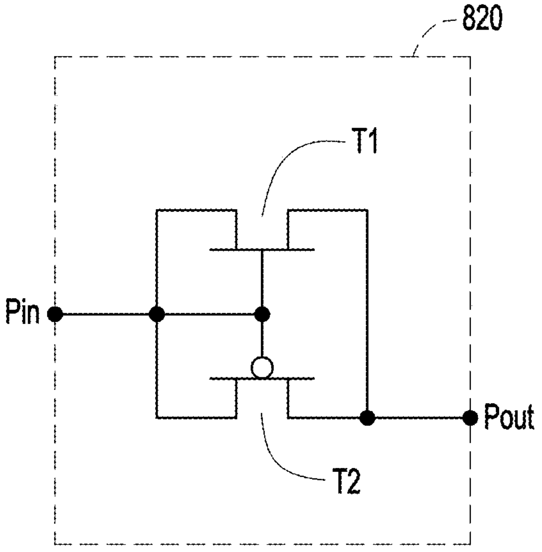
FIG. 8A is a schematic diagram of a slew rate control circuit according to an embodiment of the disclosure.
Figure 8B:
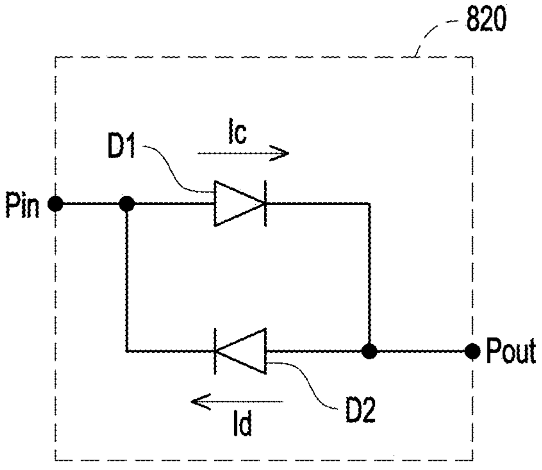
FIG. 8B is a schematic equivalent circuit diagram of the embodiment of FIG. 8A of the disclosure.

FIG. 8A is a schematic diagram of a slew rate control circuit according to an embodiment of the disclosure. FIG. 8B is a schematic equivalent circuit diagram of the embodiment of FIG. 8A of the disclosure. In the embodiment of the disclosure, the slew rate control circuit 220 of FIG. 2 may be implemented as the slew rate control circuit 820 of FIG. 8A. Referring to FIG. 8A, the slew rate control circuit 820 includes a first transistor T1, a second transistor T2, an input terminal Pin, and an output terminal Pout. A control terminal of the first transistor T1 is coupled to the input terminal Pin. A first terminal of the first transistor T1 is coupled to the input terminal Pin. A second terminal of the first transistor T1 is coupled to the output terminal Pout. A control terminal of the second transistor T2 is coupled to the input terminal Pin. A first terminal of the second transistor T2 is coupled to the input terminal Pin. A second terminal of the second transistor T2 is coupled to the output terminal Pout. The first transistor T1 may be an n-type transistor, and the second transistor T2 may be a p-type transistor.

Referring to FIG. 8A and FIG. 8B, the first transistor T1 may be equivalent to a diode D1, and the second transistor T2 may be equivalent to a diode D2. An anode of the diode D1 is coupled to the input terminal Pin and a cathode of the diode D2. A cathode of the diode D1 is coupled to the output terminal Pout and an anode of the diode D2. A cathode of the diode D2 is coupled to the input terminal Pin. An anode of the diode D2 is coupled to the output terminal Pout. Referring to FIG. 3 and FIG. 8B, during a rising period of the voltage level of the scan signal SS, a charge current Ic flows from the anode of the diode D1 to the cathode of the diode D1. During a falling period of the voltage level of the scan signal SS, a discharge current Id flows from the anode of the diode D2 to the cathode of the diode D2. Thus, the output terminal Pout of the slew rate control circuit 820 may output the adjusted scan signal SS' as shown in FIG. 3, and the adjusted scan signal SS' may achieve a fast charging with a low DAHC stress and a low kickback effect of the scan transistor.

Figure 9A:
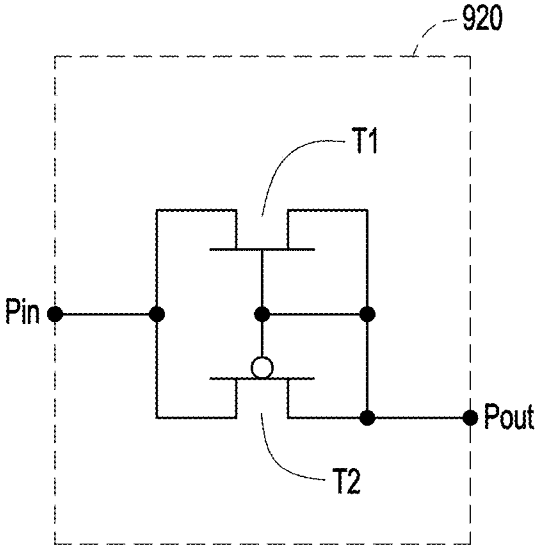
FIG. 9A is a schematic diagram of a slew rate control circuit according to an embodiment of the disclosure.
Figure 9B:
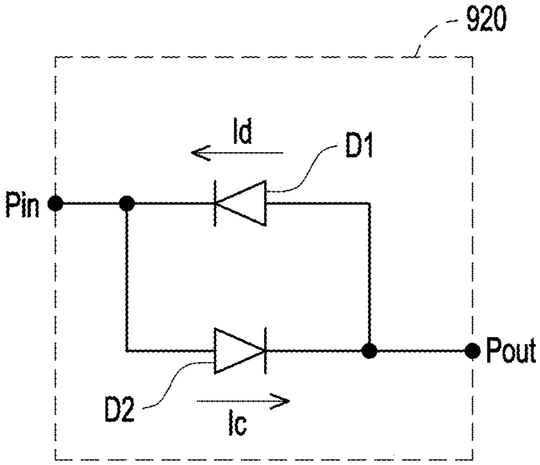
FIG. 9B is a schematic equivalent circuit diagram of the embodiment of FIG. 9A of the disclosure.

FIG. 9A is a schematic diagram of a slew rate control circuit according to an embodiment of the disclosure. FIG. 9B is a schematic equivalent circuit diagram of the embodiment of FIG. 9A of the disclosure. In the embodiment of the disclosure, the slew rate control circuit 220 of FIG. 2 may be implemented as the slew rate control circuit 920 of FIG. 9A. Referring to FIG. 9A, the slew rate control circuit 920 includes a first transistor T1, a second transistor T2, an input terminal Pin, and an output terminal Pout. A control terminal of the first transistor T1 is coupled to the output terminal Pout. A first terminal of the first transistor T1 is coupled to the input terminal Pin. A second terminal of the first transistor T1 is coupled to the output terminal Pout. A control terminal of the second transistor T2 is coupled to the output terminal Pout. A first terminal of the second transistor T2 is coupled to the input terminal Pin. A second terminal of the second transistor T2 is coupled to the output terminal Pout. The first transistor T1 may be an n-type transistor, and the second transistor T2 may be a p-type transistor.

Referring to FIG. 9A and FIG. 9B, the first transistor T1 may be equivalent to a diode D1, and the second transistor T2 may be equivalent to a diode D2. A cathode of the diode D1 is coupled to the input terminal Pin and an anode of the diode D2. An anode of the diode D1 is coupled to the output terminal Pout and a cathode of the diode D2. An anode of the diode D2 is coupled to the input terminal Pin. A cathode of the diode D2 is coupled to the output terminal Pout. Referring to FIG. 3 and FIG. 9B, during a rising period of the voltage level of the scan signal SS, a charge current Ic flows from the anode of the diode D2 to the cathode of the diode D2. During a falling period of the voltage level of the scan signal SS, a discharge current Id flows from the anode of the diode D1 to the cathode of the diode D1. Thus, the output terminal Pout of the slew rate control circuit 920 may output the adjusted scan signal SS' as shown in FIG. 3, and the adjusted scan signal SS' may achieve a fast charging with a low DAHC stress and a low kickback effect of the scan transistor.

Figure 10A:
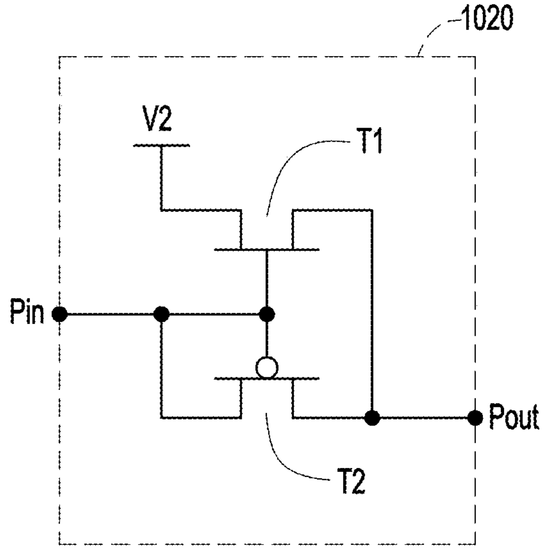
FIG. 10A is a schematic diagram of a slew rate control circuit according to an embodiment of the disclosure.
Figure 10B:
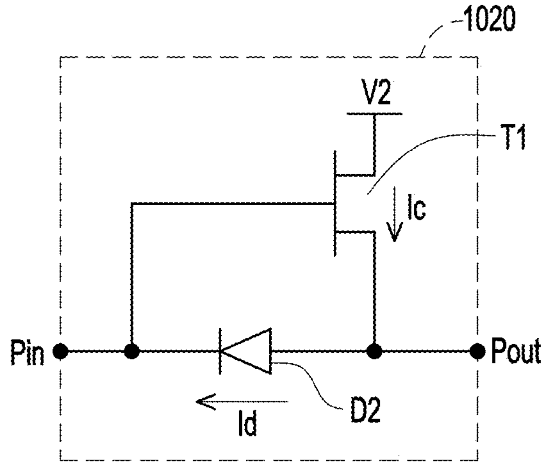
FIG. 10B is a schematic equivalent circuit diagram of the embodiment of FIG. 10A of the disclosure.

FIG. 10A is a schematic diagram of a slew rate control circuit according to an embodiment of the disclosure. FIG. 10B is a schematic equivalent circuit diagram of the embodiment of FIG. 10A of the disclosure. In the embodiment of the disclosure, the slew rate control circuit 220 of FIG. 2 may be implemented as the slew rate control circuit 1020 of FIG. 10A. Referring to FIG. 10A, the slew rate control circuit 1020 includes a first transistor T1, a second transistor T2, an input terminal Pin, and an output terminal Pout. A control terminal of the first transistor T1 is coupled to the input terminal Pin. A first terminal of the first transistor T1 is coupled to a direct current voltage V2. A second terminal of the first transistor T1 is coupled to the output terminal Pout. A control terminal of the second transistor T2 is coupled to the input terminal Pin. A first terminal of the second transistor T2 is coupled to the input terminal Pin. A second terminal of the second transistor T2 is coupled to the output terminal Pout. The first transistor T1 may be an n-type transistor, and the second transistor T2 may be a p-type transistor.

Referring to FIG. 10A and FIG. 10B, the first transistor T1 may be equivalent to a source follower amplifier, and the second transistor T2 may be equivalent to a diode D2. A cathode of the diode D2 is coupled to the input terminal Pin and the control terminal of the first transistor T1. An anode of the diode D2 is coupled to the output terminal Pout and the second terminal of the first transistor T1. Referring to FIG. 3 and FIG. 10B, during a rising period of the voltage level of the scan signal SS, a charge current Ic flows from the first terminal of the first transistor T1 to the second terminal of the first transistor T1. During a falling period of the voltage level of the scan signal SS, a discharge current Id flows from the anode of the diode D2 to the cathode of the diode D2. Thus, the output terminal Pout of the slew rate control circuit 1020 may output the adjusted scan signal SS' as shown in FIG. 3, and the adjusted scan signal SS' may achieve a fast charging with a low DAHC stress and a low kickback effect of the scan transistor.

In addition, referring to FIG. 3 and FIG. 10A, in the embodiment of the disclosure, a voltage level of the direct current voltage V2 may be higher than the first low voltage level VGL1, but the disclosure is not limited thereto. In one embodiment of the disclosure, the direct current voltage V2 may be equal to the first high voltage level VGH1.

Figure 11A:
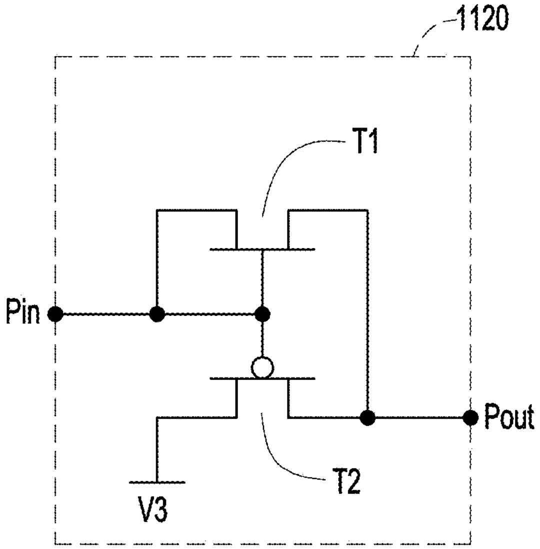
FIG. 11A is a schematic diagram of a slew rate control circuit according to an embodiment of the disclosure.
Figure 11B:
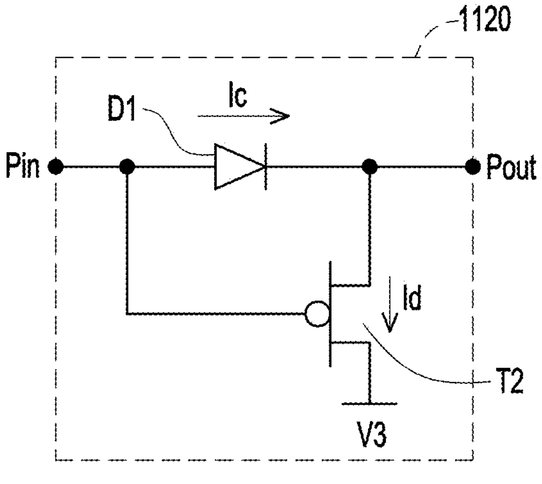
FIG. 11B is a schematic equivalent circuit diagram of the embodiment of FIG. 11A of the disclosure.

FIG. 11A is a schematic diagram of a slew rate control circuit according to an embodiment of the disclosure. FIG. 11B is a schematic equivalent circuit diagram of the embodiment of FIG. 11A of the disclosure. In the embodiment of the disclosure, the slew rate control circuit 220 of FIG. 2 may be implemented as the slew rate control circuit 1120 of FIG. 11A. Referring to FIG. 11A, the slew rate control circuit 1120 includes a first transistor T1, a second transistor T2, an input terminal Pin, and an output terminal Pout. A control terminal of the first transistor T1 is coupled to the input terminal Pin. A first terminal of the first transistor T1 is coupled to the input terminal Pin. A second terminal of the first transistor T1 is coupled to the output terminal Pout. A control terminal of the second transistor T2 is coupled to the input terminal Pin. A first terminal of the second transistor T2 is coupled to a direct current voltage V3. A second terminal of the second transistor T2 is coupled to the output terminal Pout. The first transistor T1 may be an n-type transistor, and the second transistor T2 may be a p-type transistor.

Referring to FIG. 11A and FIG. 11B, the first transistor T1 may be equivalent to a diode D1, and the second transistor T2 may be equivalent to a source follower amplifier. An anode of the diode D1 is coupled to the input terminal Pin and the control terminal of the second transistor T2. A cathode of the diode D1 is coupled to the output terminal Pout and the second terminal of the second transistor T2. Referring to FIG. 3 and FIG. 11B, during a rising period of the voltage level of the scan signal SS, a charge current Ic flows from the anode of the diode D1 to the cathode of the diode D1. During a falling period of the voltage level of the scan signal SS, a discharge current Id flows from the second terminal of the second transistor T2 to the first terminal of the second transistor T2. Thus, the output terminal Pout of the slew rate control circuit 1120 may output the adjusted scan signal SS' as shown in FIG. 3, and the adjusted scan signal SS' may achieve a fast charging with a low DAHC stress and a low kickback effect of the scan transistor.

In addition, referring to FIG. 3 and FIG. 11A, in the embodiment of the disclosure, a voltage level of the direct current voltage V3 may be lower than the first high voltage level VGH1, but the disclosure is not limited thereto. In one embodiment of the disclosure, the direct current voltage V3 may be equal to the first low voltage level VGL1.

Figure 12A:
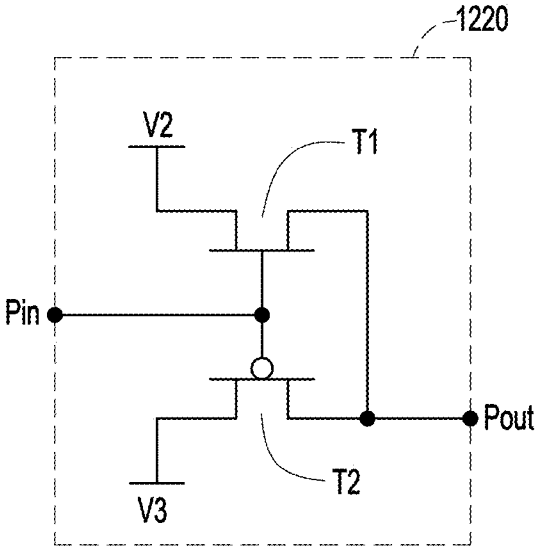
FIG. 12A is a schematic diagram of a slew rate control circuit according to an embodiment of the disclosure.
Figure 12B:
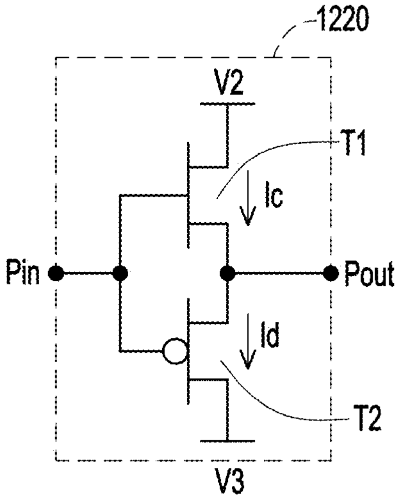
FIG. 12B is a schematic equivalent circuit diagram of the embodiment of FIG. 12A of the disclosure.

FIG. 12A is a schematic diagram of a slew rate control circuit according to an embodiment of the disclosure. FIG. 12B is a schematic equivalent circuit diagram of the embodiment of FIG. 12A of the disclosure. In the embodiment of the disclosure, the slew rate control circuit 220 of FIG. 2 may be implemented as the slew rate control circuit 1220 of FIG. 12A. Referring to FIG. 12A, the slew rate control circuit 1220 includes a first transistor T1, a second transistor T2, an input terminal Pin, and an output terminal Pout. A control terminal of the first transistor T1 is coupled to the input terminal Pin. A first terminal of the first transistor T1 is coupled to a direct current voltage V2. A second terminal of the first transistor T1 is coupled to the output terminal Pout. A control terminal of the second transistor T2 is coupled to the input terminal Pin. A first terminal of the second transistor T2 is coupled to a direct current voltage V3. A second terminal of the second transistor T2 is coupled to the output terminal Pout. The first transistor T1 may be an n-type transistor, and the second transistor T2 may be a p-type transistor.

Referring to FIG. 12A and FIG. 12B, the first transistor T1 may be equivalent to a source follower amplifier, and the second transistor T2 may be equivalent to another source follower amplifier. Referring to FIG. 3 and FIG. 12B, during a rising period of the voltage level of the scan signal SS, a charge current Ic flows from the first terminal of the first transistor T1 to the second terminal of the first transistor T1. During a falling period of the voltage level of the scan signal SS, a discharge current Id flows from the second terminal of the second transistor T2 to the first terminal of the second transistor T2. Thus, the output terminal Pout of the slew rate control circuit 1220 may output the adjusted scan signal SS' as shown in FIG. 3, and the adjusted scan signal SS' may achieve a fast charging with a low DAHC stress and a low kickback effect of the scan transistor.

In addition, referring to FIG. 3 and FIG. 12A, in the embodiment of the disclosure, a voltage level of the direct current voltage V2 may be higher than the first low voltage level VGL1, but the disclosure is not limited thereto. In one embodiment of the disclosure, the direct current voltage V2 may be equal to the first high voltage level VGH1. In the embodiment of the disclosure, a voltage level of the direct current voltage V3 may be lower than the first high voltage level VGH1, but the disclosure is not limited thereto. In one embodiment of the disclosure, the direct current voltage V3 may be equal to the first low voltage level VGL1.

Figure 13:
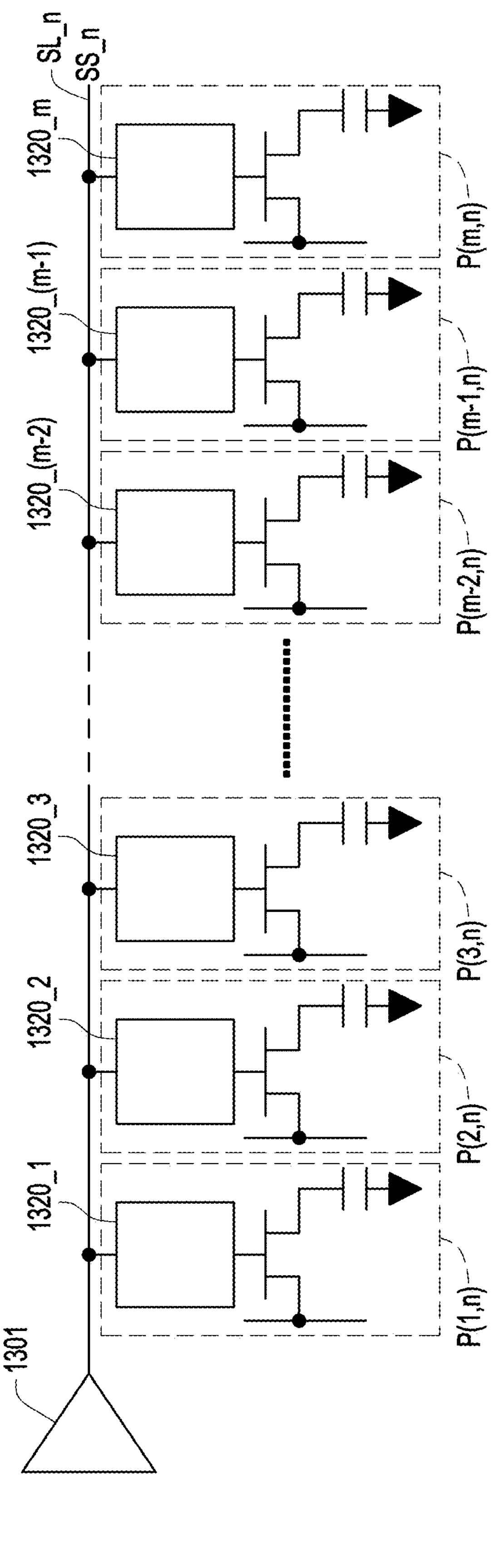
FIG. 13 is a schematic diagram of one row of pixels in an active matrix device according to an embodiment of the disclosure.

FIG. 13 is a schematic diagram of one row of pixels in an active matrix device according to an embodiment of the disclosure. Referring to FIG. 1, in the embodiment of the disclosure, each of the pixels P(1,1) to P(m,n) includes a pixel circuit 111 and a tunable component 112, and the each of the pixels P(1,1) to P(m,n) may further include a slew rate control circuit. Referring to FIG. 13, taking one row of pixels P(1,1) to P(m,n) in the active matrix device 110 as an example, the electronic device 100 may further include a scan driver 1301, the pixels P(1,n) to P(m,n) may further include a plurality of slew rate control circuits 1320_1~1320_*m*. The scan driver 1301 is coupled to the input terminals of the slew rate control circuits 1320_1~1320_*m* of the pixels P(1,n) to P(m,n) through a scan line SL_n. The scan driver 1301 may output a scan signal SS_n to the pixels P(1,n) to P(m,n), and the slew rate control circuits 1320_1~1320_*m* may respectively adjust the scan signal SS_n to provide corresponding adjusted scan signals to the scan transistor of each of the pixels P(1,n) to P(m,n). Therefore, a signal distortion of the scan signal SS_n for driving the pixels P(1,n) to P(m,n) may be effectively mitigated through a larger input impedance of the slew rate control circuit than the scan transistors of the pixels P(1,n) to P(m,n).

Figure 14:
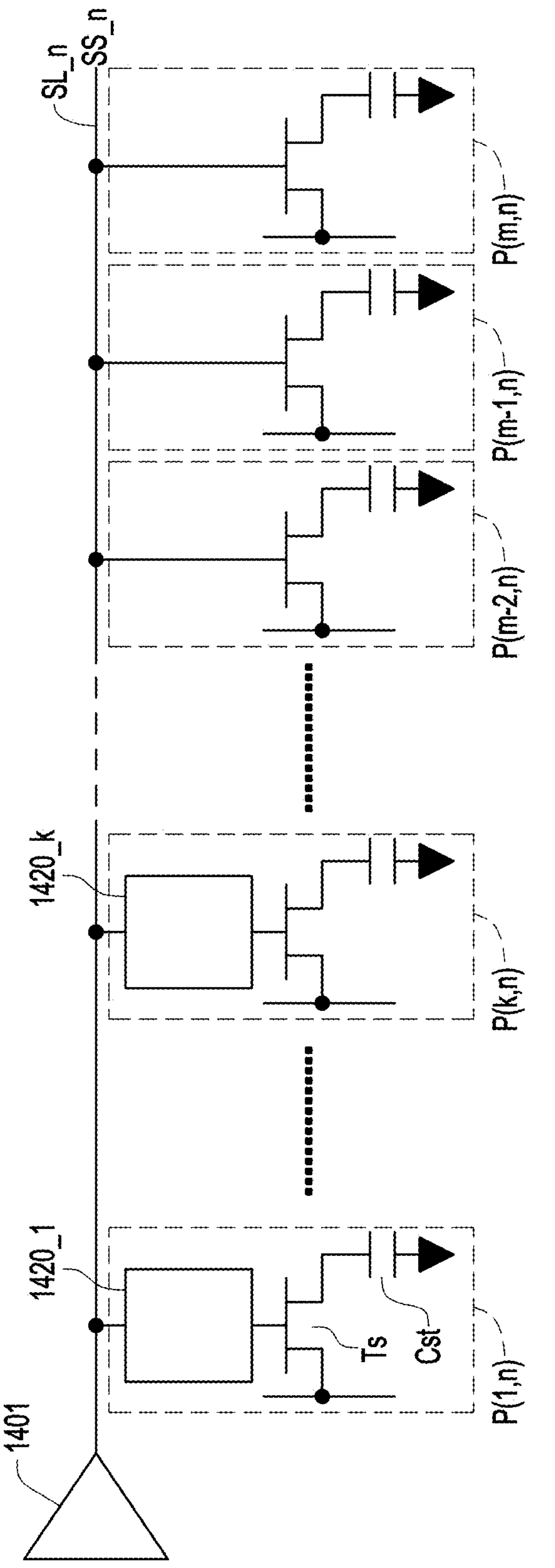
FIG. 14 is a schematic diagram of one row of pixels in an active matrix device according to an embodiment of the disclosure.

FIG. 14 is a schematic diagram of one row of pixels in an active matrix device according to an embodiment of the disclosure. Referring to FIG. 1, in the embodiment of the disclosure, each of the pixels P(1,1) to P(m,n) includes a pixel circuit 111 and a tunable component 112, and each of a part of the pixels P(1,1) to P(m,n) may further include a slew rate control circuit. Referring to FIG. 14, taking one row of pixels P(1,1) to P(m,n) in the active matrix device 110 as an example, the electronic device 100 may further include a scan driver 1401, and the pixels P(1,n) to P(k,n) may further include a plurality of slew rate control circuits 1420_1~1420_*k*, where k is between 1 and k. The scan driver 1401 is coupled to the input terminals of the slew rate control circuits 1420_1~1420_*k* of the pixels P(1,n) to P(k,n) through a scan line SL_n and directly coupled to the pixels P(k+1,n) to P(m,n), where k is a positive integer. The pixels P(1,n) to P(k,n) are close to the scan driver 1401 (near side). The scan driver 1401 may output a scan signal SS_n to the pixels P(1,n) to P(m,n), and the slew rate control circuits 1420_1~1420_*k* may respectively adjust the scan signal SS_n to provide corresponding adjusted scan signals to the scan transistor of each one of the pixels P(1,n) to P(k,n). Therefore, a signal distortion of the scan signal SS_n for driving the pixels P(1,n) to P(m,n) may be effectively mitigated through a larger input impedance of the slew rate control circuit than the scan transistors of the pixels P(1,n) to P(k,n).

Figure 15:
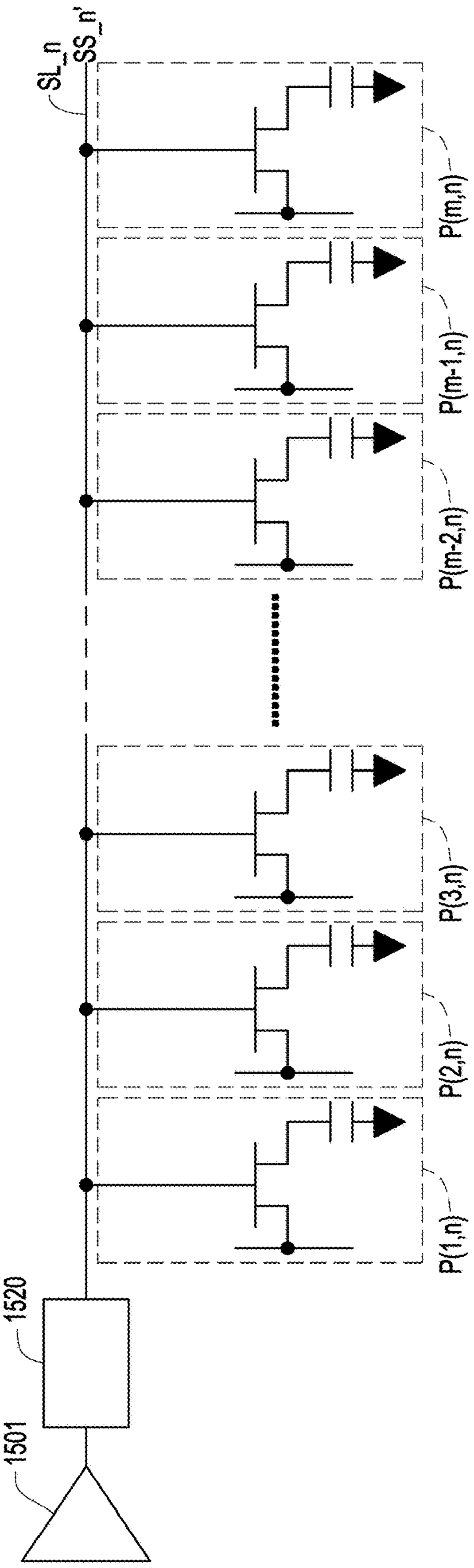
FIG. 15 is a schematic diagram of one row of pixels in an active matrix device according to an embodiment of the disclosure.

FIG. 15 is a schematic diagram of one row of pixels in an active matrix device according to an embodiment of the disclosure. Referring to FIG. 1, in the embodiment of the disclosure, each one of the pixels P(1,1) to P(m,n) includes a pixel circuit 111 and a tunable component 112, and each row of the pixels P(1,1) to P(m,n) may correspond to one slew rate control circuit. Referring to FIG. 15, taking one row of pixels P(1,1) to P(m,n) in the active matrix device 110 as an example, the electronic device 100 may further include a scan driver 1501 and a slew rate control circuit 1520, and the scan driver 1501 is coupled to the input terminal of the slew rate control circuit 1520. The slew rate control circuit 1520 is further coupled to the pixels P(1,n) to P(m,n) through a scan line SL_n. The scan driver 1501 may output a scan signal to the slew rate control circuit 1520. The slew rate control circuit 1520 may adjust the scan signal to provide corresponding adjusted scan signal SS_n' to the pixels P(1,n) to P(m,n) with optimizing rise and fall times of the adjusted scan signal SS_n' to mitigate a signal distortion of the adjusted scan signal SS_n. Therefore, a signal distortion of the adjusted scan signal SS_n' for driving the pixels P(1,n) to P(m,n) may have lower signal distortion.

In summary, according to the electronic device of the disclosure, the slew rate control circuit includes two transistors, and each transistor forms a diode or a source follower amplifier. The slew rate control circuit of the disclosure is disposed between the scan driver and the scan transistor in the pixel of the active matrix device, and achieves independent slew rate control (i.e. optimizing the rise and fall times of the scan signal) by adjusting the width and length of each transistor. The slew rate control circuit of the disclosure alleviates clock feed-through (i.e., kickback) and DAHC stress on the scan transistor. In addition, the slew rate control circuit of the disclosure suppresses scan signal distortion through a larger input impedance than the scan transistor. Therefore, the slew rate control circuit of the disclosure improves the reliability and uniformity of the active matrix device.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An electronic device, comprising:

a slew rate control circuit, consisting of a first transistor, a second transistor, an input terminal which receives a scan signal switching between overtime varying changing a first high voltage level and a first low voltage level, and an output terminal which continuously outputs an adjusted scan signal switching between overtime varying changing a second high voltage level and a second low voltage level from the received scan signal, wherein the first transistor and the second transistor are the same type of transistors, and depending on a phase of the adjusted scan signal, one of the first transistor and the second transistor is acting as a diode when the other of the first transistor and the second transistor acting as a source follower amplifier, wherein the input terminal is coupled to a scan driver, and the output terminal is coupled to a control terminal of a scan transistor of at least one pixel of an active matrix device.

2. The electronic device according to claim 1, wherein a control terminal of the first transistor is coupled to the input terminal, and a terminal of the first transistor is coupled to the output terminal, wherein a control terminal and a terminal of the second transistor is coupled to the output terminal.

3. The electronic device according to claim 2, wherein another terminal of the first transistor is coupled to the input terminal.

4. The electronic device according to claim 2, wherein another terminal of the first transistor is coupled to a direct current voltage.

5. The electronic device according to claim 4, wherein a voltage level of the direct current voltage is higher than the first low voltage level.

6. The electronic device according to claim 4, wherein a voltage level of the direct current voltage is lower than the first high voltage level.

7. The electronic device according to claim 2, wherein another terminal of the second transistor is coupled to the input terminal.

8. The electronic device according to claim 1, wherein at least one of a rising time and a falling time of the adjusted scan signal is longer than a rising time and a falling time of the scan signal respectively.

9. The electronic device according to claim 1, wherein the first transistor and the second transistor are n-type transistors or p-type transistors.

10. An electronic device, comprising:

a slew rate control circuit, consisting of a first transistor, a second transistor, an input terminal which receives a scan signal switching between overtime varying changing a first high voltage level and a first low voltage level, and an output terminal which continuously outputs an adjusted scan signal switching between overtime varying changing a second high voltage level and a second low voltage level from the received scan signal, wherein the first transistor is an n-type transistor, and the second transistor is a p-type transistor, wherein depending on a phase of the adjusted scan signal, one of the first transistor and the second transistor is acting as a diode when the other of the first transistor and the second transistor acting as a source follower amplifier, wherein the input terminal is coupled to a scan driver, and the output terminal is coupled to at least one pixel of an active matrix device.

11. The electronic device according to claim 10, wherein a control terminal of the first transistor is coupled to a control terminal of the second transistor, and terminals of the first transistor and the second transistor are coupled to the output terminal.

12. The electronic device according to claim 11, wherein the control terminals of the first transistor and the second transistor are coupled to the input terminal.

13. The electronic device according to claim 11, wherein the control terminals of the first transistor and the second transistor are coupled to the output terminal.

14. The electronic device according to claim 11, wherein another terminal of the first transistor is coupled to the input terminal.

15. The electronic device according to claim 11, wherein another terminal of the first transistor is coupled to a direct current voltage.

16. The electronic device according to claim 11, wherein another terminal of the second transistor is coupled to the input terminal.

17. The electronic device according to claim 11, wherein another terminal of the second transistor is coupled to a direct current voltage.

18. The electronic device according to claim 10, wherein at least one of a rising time and a falling time of the adjusted scan signal is longer than a rising time and a falling time of the scan signal respectively.

* * * * *